UNITED STATES PATENT OFFICE.

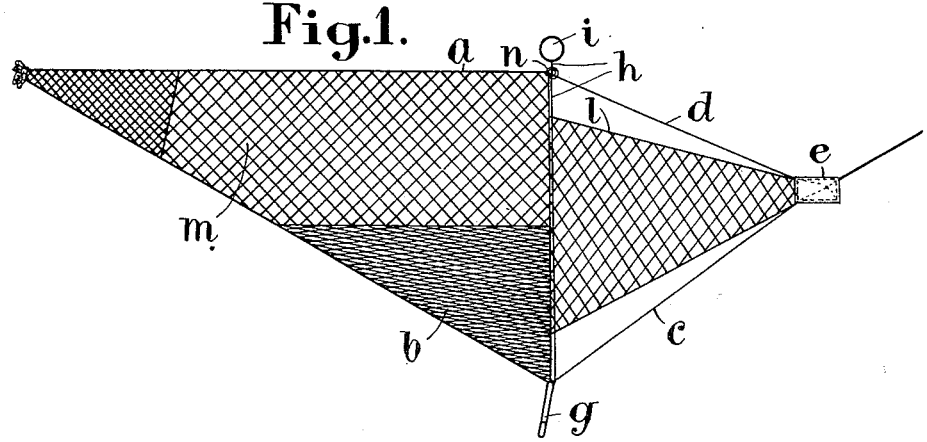
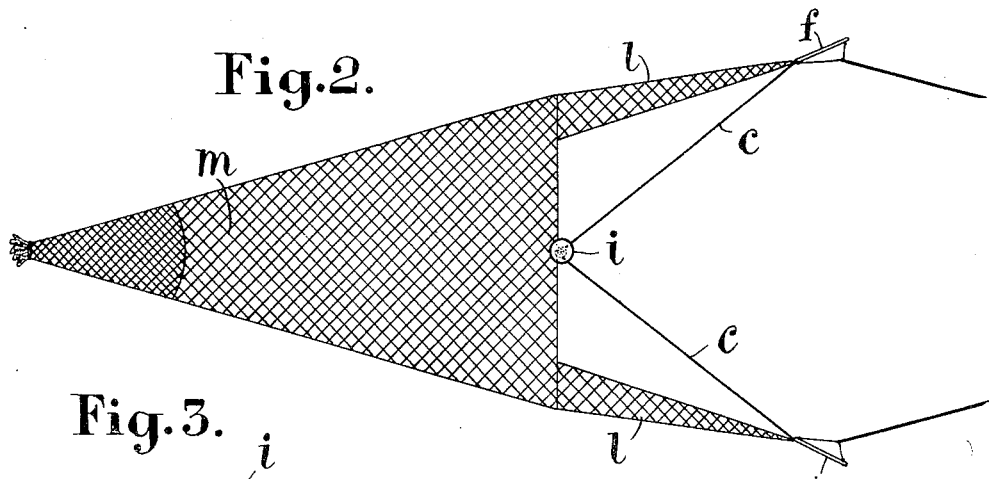
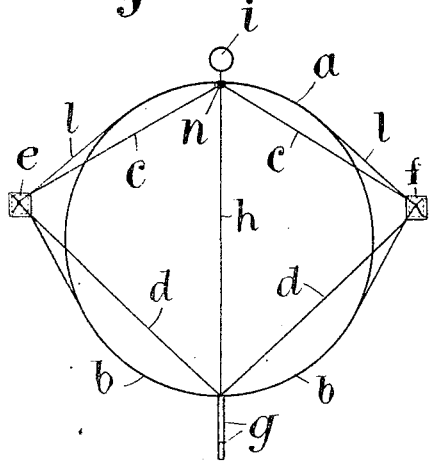

CHRISTEN HEIBERG KAHRS, OF CHRISTIANIA, NORWAY.

TRAWLING-NET.

1,061,082.

Specification of Letters Patent.

Patented May 6, 1913.

Application filed May 24, 1912. Serial No. 699,412.

*To all whom it may concern:*

Be it known that I, CHRISTEN HEIBERG KAHRS, a subject of the King of Norway, residing at Christiania, Norway, have invented certain new and useful Improvements in Trawling-Nets; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.
My invention relates to trawling nets and its object is to so construct the net that in spite of the pull exerted upon it in an upward direction, during trawling, the net will be pulled downward. This object I attain by weaving the sloping bottom portion of the net more closely than the other portion, whereby the sloping bottom portion is subjected to a greater pressure by the water than the other portion, which pressure will act to pull the net down.

In the drawing, Figure 1 illustrates a side elevation of a trawling net embodying my invention, Fig. 2 is a top plan view of the same, Fig. 3 is a front view, and Fig. 4 a detail view.

The main portion of the trawl consists of an irregular cone, the upper straight line $a$ of which is held substantially horizontal, while the lower portion $b$ slopes downward.
The top portion, or point, is woven, as is usual, more strongly and more closely than the rest.

The net is kept expanded during the trawling by means of the arms $c, d$, attached to the circumference of the opening, boards $e, f$ being fixed to said arms. The warps are secured to these boards, as shown in Figs. 2 and 4, in such a way, that the pressure of the water tends to press the boards outward.
The connection between the boards $e, f$, and the side of the trawl is formed by means of triangular pieces of net $l$, with a view to distributing the pull over as large as possible a part of the net at the circumference of its opening, so as to make the opening circular, or nearly circular.

The sloping bottom portion $b$ is made of a net having much finer meshes than the other net of the trawl. The meshes of this fine net are extraordinarily long and narrow, the length and width of said meshes being approximately in proportion 4:1. The object of making the meshes of this portion of the trawl smaller than the rest of the meshes is to provide a comparatively large area of resistance to the water, as the net is pulled along, whereby the trawl is pulled deeper down into the water. The meshes are made long and narrow, so that no substantial resistance is offered against forward movement.

A round pole $g$ is attached to the lower end of the trawl. The lower part of this pole is made of iron or other heavy metal, the rest being wood, or other light material. A rope $h$, the length of which is equal to the diameter of the net opening, is attached to the same point of the lower edge of the trawl, where the said pole is attached. The rope $h$ is guided through a thimble $n$, fixed to the upper edge of the net opening, and a float $i$ is fastened to the free end of the rope, the buoyancy of said float balancing approximately the weight of the pole $g$.

In shallow water, when the trawl gets too near the bottom, the pole $g$, with its heavy end, will touch. As soon, however, as the weight of the pole is thus no longer supported by the float, the latter will lift the front part of the trawl, until pole $g$ assumes a substantially vertical position, just touching bottom. As the rope $h$ is attached to the front part of the trawl at the bottom thereof, this part will be lifted up, so that, to a great extent, the lower portion will lose its sloping position, whereby, of course, the tendency of pulling the trawl downward becomes diminished. It will be seen, therefore, that the trawl will rise as soon as the pole $g$ touches bottom, and thus, the trawling net itself will not touch bottom.

In order not to interfere with the rising of the trawl I make the boards $e, f$ of a frame $o$, consisting of rigid material, for instance, wood, covered by another material $p$, such as thin sheet metal, fabric, or the like. In order to hold this cover against the pressure of the water, the opening of the frame is likewise covered by means of a net $r$ of string wire, ribbons or the like.

The construction of the boards is best seen in Fig. 4, showing this part of the trawl on an enlarged scale. For the sake of clearness, a portion of the cover *p* is broken away, to show the net *r*. Such a kind of board will be much lighter than an ordinary board for the same purpose and yet will be of the same strength.

I claim:—

1. In trawling nets the combination with a closely woven bottom portion sloping down in the direction of draft, of a pole made of light material and having a heavy end and secured with its light end to the front part of the sloping bottom.

2. In trawling nets the combination with a closely woven bottom portion sloping in the direction of draft, of a pole made of light material and having a heavy end and secured with its light end to the front part of the sloping bottom, and a rope also secured to the front part of the sloping bottom, and a thimble in the upper part of the trawl for guiding said rope.

3. In trawling nets the combination with a closely woven bottom portion sloping in the direction of draft, of a pole made of light material and having a heavy end and secured with its light end to the front part of the sloping bottom, and a rope also secured to the front part of the sloping bottom, and a thimble in the upper part of the trawl for guiding said rope, and a float attached to the rope above the said thimble.

In testimony that I claim the foregoing as my invention, I have signed my name in presence of two subscribing witnesses.

CHRISTEN HEIBERG KAHRS.

Witnesses:
   AUG. OLSEN,
   THS. HERZ.